No. 893,723. PATENTED JULY 21, 1908.
H. E. GOLDBERG.
CALCULATING MACHINE.
APPLICATION FILED DEC. 22, 1905.

Witnesses:
Harry R. L. White.
Ray White

Inventor:
Hyman E. Goldberg.
By Cheever & Cox
Atty's

No. 893,723. PATENTED JULY 21, 1908.
H. E. GOLDBERG.
CALCULATING MACHINE.
APPLICATION FILED DEC. 22, 1905.

Witnesses:
Harry R. L. White
Ray White

Inventor:
Hyman Eli Goldberg,
By Cheever & Cox
Attys

UNITED STATES PATENT OFFICE.

HYMAN ELI GOLDBERG, OF CHICAGO, ILLINOIS, ASSIGNOR TO GOLDBERG CALCULATING MACHINE COMPANY, A CORPORATION OF ILLINOIS.

CALCULATING-MACHINE.

No. 893,723.  Specification of Letters Patent.  Patented July 21, 1908.

Application filed December 22, 1905. Serial No. 292,932.

*To all whom it may concern:*

Be it known that I, HYMAN ELI GOLDBERG, a citizen of the United States, residing at Chicago, in the county of Cook and State of Illinois, have invented a certain new and useful Improvement in Calculating-Machines, of which the following is a specification.

My invention relates to calculating machines having means for controlling the totalizer to determine whether the same shall add or subtract or not operate at any given point.

The calculating machine here shown is in many respects the same as the one shown in my application for patent filed September 15, 1905, Serial Number 275,780. The difference between the machine there shown and the one here shown lies in the controlling device, and in the present application I do not claim broadly a controlling device capable of determining whether at any given point the totalizer shall add or subtract or not operate, but the present claims are to be construed as subject to the ones made in the aforesaid previous application.

In the former application the form of controlling device shown was a cam and pin mechanism, and the pins were shown to be stationary while the cams moved relatively thereto. Also the pins were adjustable in their holders and the adjustment of the pin determined which of the three possible results in the operation of the mechanism should occur.

The object of the present invention is to provide a stationary cam and a traveling pin, and also to provide means for facilitating the removal and substitution of different shaped cams; also to provide means whereby cams embodying different combinations of acting surfaces may be employed.

To illustrate my last object, suppose it be desired that a given totalizer shall add in the first column, subtract in the second and remain idle in the third. These three conditions can be obtained in the present device by inserting a cam having surfaces arranged to produce this particular combination of actions. Suppose for another set of bills or accounts, it should be desired that the same totalizer should subtract in the first column, remain idle in the second column, and add in the third column. This different combination of actions could in my present invention be obtained by introducing a cam capable of producing this particular combination of actions, and as a result of this present invention the operator is able by selecting the proper cam, to produce any particular combination of actions that he desires.

I obtain my objects by the mechanism illustrated in the accompanying drawings, in which.

Similar numerals refer to similar parts throughout the several views.

1 represents the framework of a typewriter having a laterally shiftable carriage 2 and vertically movable keys 3. Such ones of said keys as are numeral keys are connected by means of links 4, or otherwise, to an appropriate part of the valuating mechanism 5. The precise construction of said valuating mechanism is immaterial, its function being to drive gear wheel 6 different amounts, depending upon the value of the key temporarily in action. A suitable form of valuating mechanism is fully described in Patent No. 782,554, issued to me February 14, 1905. Wheel 6 rotates always in the same direction and is adapted to drive the wheels 7 and 8 which are connected together so as to rotate as a single piece. In the present instance they are journaled in the hanger 9 secured to the stationary bracket 10, said bracket being bolted or otherwise secured to the frame-work 1.

From wheels 7 and 8 connections are provided for rotating the setting-wheel shafts 11 and 12; and in the construction here illustrated, these connections comprise the miter gear wheels 13, 14, 15, 16, 17 and 18, gear wheels 13 and 14 rotating as a single piece and operating to drive the gear wheel 15, which is rigidly affixed to shaft 11. Gear wheels 16 and 17 rotate as a single piece and operate to drive the gear wheel 18, which is rigidly affixed to shaft 12. The axes of wheels 13, 14, 16 and 17 are stationary and in the present design are vertical, and said wheels are journaled in suitable bearings mounted on the bracket 10. Shafts 11 and 12 have axes parallel to the path of the traveling carriages 2, and in the present instance they are journaled in bearings 19 mounted on bracket 10. The shaft 11 has rigidly fixed thereon a set of spur wheels 20, and, similarly, shaft 12 has rigidly fixed thereon a set of spur wheels 21, said wheels being designed to operate the accumulating wheels 22 of the totalizers. The arrangement is such that each wheel 20 is directly opposite to its respective wheel 21, but at such a distance therefrom that a receiving wheel is never in mesh with both operating wheels at once. It may be in mesh with either one or out of mesh with both. Shafts 11 and 12 rotate in opposite directions, and therefore one of them will cause the receiving wheels to rotate in one direction and the other in the opposite direction. The totalizer here shown is adapted to add when operated in one direction and to subtract when operated in the opposite direction, and although various types of totalizers may be employed, for example, the one shown in the patent granted to me October 20, 1903, Serial No. 741,961, I have here shown and will now describe the form of totalizer for which Letters-Patent No. 782,604 were granted to me February 14, 1905.

Referring more particularly to Figs. 13 to 20, both inclusive, each totalizer comprises a shaft 23 non-rotatively mounted in the side walls or totalizer framework 24 and a plurality of sets or groups consisting of five principal parts, namely: totalizing wheels 25, carrying pinions 26, accumulating wheels 22, above mentioned, epicyclic pinions 27 and the intermediate wheels 28. Wheels 22, 25 and 28 are all freely rotatable about shaft 23 independently thereof, with the exception of wheel $28^a$ located at the extreme right to correspond with the units column. This wheel is rigidly fastened to shaft 23 by means of a pin $28^b$ (shown in Fig. 15) although any other means may be substituted for holding it rigid and non-rotatable. The function of said wheel $28^a$ is to form the fixed basis of reference or foundation piece for the mechanism from which the rotatable parts move their definite amounts. In each group of parts, $23^a$ represents a supporting piece, which in the present instance, is disklike in form and is secured to shaft 23 by means of a spline $23^b$. Said supporting piece is provided at its left side with a hub $23^c$, which is cylindrical and forms a bearing whereon the intermediate wheel 28 is freely rotatable. The pin $23^d$ extends toward the left from said supporting piece $23^a$ and serves as an axle whereon the carrying pinion 26 is freely rotatable. Said pinion has eight long and short teeth alternating with each other for alternately being locked and rotated by the totalizing wheels 25 in the manner hereinafter described.

Figure 14:
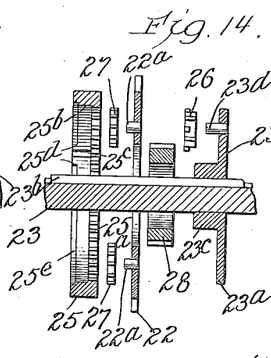
Fig. 14 is a sectional view of the parts shown in Fig. 13. In this view the parts are not assembled but are arranged in a group for the purpose of illustrating their coöperative relationship.
Figure 15:
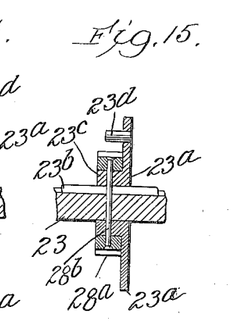
Fig. 15 is a sectional view of the intermediate wheel located farthest to the right. This wheel is non-rotatable and is shown to be pinned to the axle, whereas the intermediate wheels to the left thereof are rotatable.
Figure 16:
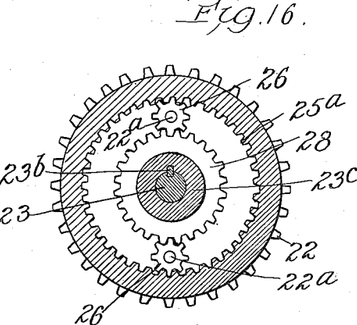
Fig. 16 is a sectional view taken on line 16—16, Fig. 13.
Figure 17:
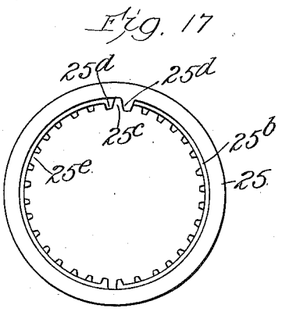
Figs. 17, 18, 19 and 20 are side views of component parts of the totalizer.
Figure 18:
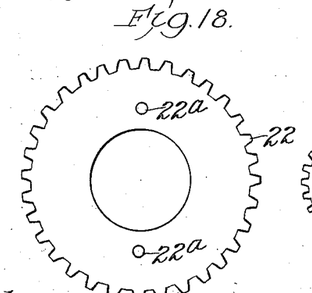
Figure 19:
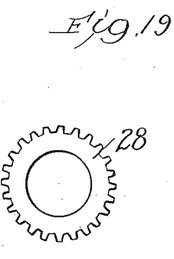
Figure 20:
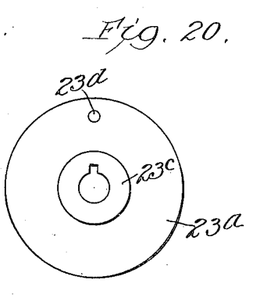

The totalizing wheels 25 carry on their cylindrical peripheries two series of figures for visibly indicating the number set up, as usual in mechanisms of this class. Each series of figures runs from "0" to "9", thus making 20 figures which are consequently $\frac{1}{20}$ of a circumference apart. Said wheels have formed upon their right portion an internal forty-toothed gear $25^a$ as best shown in Figs. 14 and 16, and to the left of said gear portion $25^a$ is an internal cylindrical surface $25^b$ for locking the carrying pinion 26, which constitutes a locking ring. Each totalizing wheel has two slots or spaces $25^c$ located diametrically opposite to each other, each slot having a projecting carrying tooth $25^d$ on each side thereof for engaging the teeth on said carrying pinion. At the left side of the totalizing wheel is an internal cylindrical surface or ring $25^e$, which is of greater diameter than ring $25^b$ and is cut in the wheel for the purpose of locking the short teeth on said carrying pinion. The construction is such that the carrying teeth $25^d$ of the wheel 25 will engage the short teeth of pinion 26 and rotate the same two steps or two spaces, after which the locking ring $25^b$ will enter between two adjacent long teeth on the pinion 26 and lock the same. During the rotation of the locking pinion the space $25^c$ will permit the rotation of the carrying pinion by receiving one of the long teeth thereof. Thus when the totalizing wheel 25 is rotated, it will, twice during each complete rotation, impart a partial rotary movement to its carrying pinion to carry the tens. Although in the present construction the totalizing wheel 25 carries at two points and has two sets of figures, the fact that it is double is merely a matter of design and convenience in the construction and operation. Each totalizing wheel 25 is supported by the contact of its internal cylindrical surface or locking ring 25$^b$ upon the cylindrical edge of the supporting piece 23$^a$. Said wheel is thus freely rotatable independently of piece 23$^a$ and remains at all times concentric with shaft 23.

The accumulating wheels 22 are analogous to the receiving wheels described in my former patents Nos. 710,772 and 741,961 and in my aforesaid patent application in, that they are adapted to be rotated different amounts for accumulating the digits. They are plain thirty-two-toothed spur gears having a comparatively large central aperture so that they may set over and be freely rotatable upon the points of the teeth of the intermediate wheels 28. By preference, said accumulating wheels are narrow and their teeth project beyond the circumference of the totalizing wheels 25, so that they may be engaged by the setting wheels 20 and 21.

The totalizing-wheel 25$^f$ and supporting-piece 23$^c$ (shown at the extreme left of Fig. 15) are slightly modified to illustrate the form which these parts will take to impart a workmanlike appearance to the highest or extreme left termination of the totalizer. Extending toward the left from each accumulating-wheel 22 are the pins 22$^a$ 22$^a$ which constitute axles for the epicyclic pinions 27, 27; said pinions are freely rotatable upon said pins 22$^a$ and are epicyclic in the sense of being rotatable upon an axis which is itself movable about another center. They are designed to remain at all times in mesh with both the intermediate-wheel 28 and the internal gear wheel 25 for transmitting rotation from the former to the latter. They are plain spur-pinions, and, in the present instance, have eight teeth which is the proper number to cooperate with the forty-toothed internal gear 25$^a$ and the twenty-four toothed intermediate spur-wheel 28. Although two epicyclic pinions 27 are here shown, one is theoretically sufficient for transmitting motion to the two carrying wheels. Two pinions cause the mechanism to operate more smoothly.

Each intermediate-wheel 28 is a wide faced twenty-four toothed spur-gear having a full complement of teeth, and when in position on the hub 23$^c$ on the piece 23$^a$, remains permanently in mesh with the carrying pinion 26, so that any rotation of said pinion will impart rotation to said intermediate-wheel. Said intermediate-wheel also remains permanently in mesh with the epicyclic pinions 27 aforesaid, and the relationship of the parts is such that the pinion 27 engages the left portion of wheel 28, while the pinion 26 engages the right portion thereof, and the accumulating-wheels 22 occupy an intermediate position. The purpose of said intermediate-wheels is to transmit rotation from the carrying pinions 26 to the epicyclic pinions 27, and through said epicyclic pinions to the accumulating-wheels 22.

To illustrate the operation of the totalizer, suppose that some one intermediate-wheel 28 is temporarily held fast, and that its accumulating-wheel is rotated one step, which, in the present construction, is $\frac{1}{32}$nd of the circumference. By means of its epicyclic pinion 27 it will move the totalizing-wheel at the left from one figure to another on the totalizing-wheel. If the accumulating-wheel 22 had been rotated several steps, then the totalizing wheel 25 would have been rotated just as many figure-distances. The figures are thus accumulated upon the totalizing-wheel. Again, suppose the accumulating-wheel 22 to be temporarily held fast and the totalizing-wheel 25 at its right to be rotated. As long as some part of the locking ring 25$^b$ on said totalizing-wheel is lying between two of the longer teeth of the carrying pinion 26, no rotation is imparted by said totalizing wheel to said pinion. But as soon as the space or cut 25$^c$ and the carrying teeth 25$^d$ pass said pinion they rotate it two steps or spaces, and immediately lock it again. This occurs when the figures "0" and "9" are interchanged at the reading line. The carrying pinions 26 rotate the intermediate-wheel 28 an equal amount, and wheel 28 rotates the epicyclic pinion 27 which rotates the wheel 25 next to the left an equal amount in the same direction as wheel 25 to the right is rotated. Thus the tens are carried. It is evident, therefore, that the mechanism is able to carry the tens when an accumulating wheel remains motionless. It is true, therefore, that the numbers may be accumulated on the totalizing wheels independently of the carrying-wheels, and the tens may be carried independently of the accumulating-wheels. Each action is independent of the other, and the actions may take place either separately or simultaneously. In either case, the final result will be the same—that is, the algebraic sum of the accumulating and carrying actions. Therefore, if the totalizing-wheels 25 show "467", for example, and it is desired to add "789", the hundreds, tens and units accumulating-wheels may be rotated seven, eight, and nine steps, respectively, at one and the same time, and the total "1256" will instantly appear and the mechanism will be ready for the next number without any further re-setting or adjustment. In other words, the mechanism is so universal in its operation that the accumulating-wheels 22 will each have their proper influence upon the mechanism, no matter whether they be rotated all at once or singly in their proper denominational order, or in any other order.

Having thus described the totalizer here indicated, which is one of the forms suitable for use in the present machine, I will now continue the description of the parts which operate the totalizer. The operating-wheels 20 and 21, hereinabove mentioned, which may be termed the "setting-wheels", occur at intervals upon their respective shafts, the distance between any two wheels upon the same shaft determining the distance between the same decimal places in the different columns on the recording sheet of paper. In the present construction, the setting-wheels have stationary axes, and the totalizing mechanism moves bodily transversely to said axes for connecting with one setting-wheel to add, or with the opposite one to subtract, or with neither to not operate. In addition to its bodily movement transverse to the axes of the setting-wheels, the totalizer shifts or travels laterally with the carriage 2, and the means for accomplishing these movements will now be described.

A bar or slide 29 is slidingly mounted upon the stationary guide-bar 30 in such manner that it may travel in a direction parallel to the axes of the setting-wheels 20, 21. In the preferred form, the traveling motion of the carriage is imparted directly to the slide 29 by means of a socket or keeper 31 fastened to said slide, and adapted to engage the arm 32 fastened to the carriage. Rigidly fastened to the slide 29, preferably by means of brackets 33 thereon, is a bar 34 which lies parallel to the axes of the setting-wheels, and is adapted to support one or more totalizers. Said totalizers are so mounted upon said bar as to travel with the same, but be independently movable transversely to the setting-wheel axes, in order to provide means whereby the totalizer may be adjusted lengthwise of bar 34. A clip 35 is mounted on said bar and so constructed as to straddle the totalizer without interfering with its transverse movement, and, at the same time, the clip prevents lateral movement. The clip may be set in any desired position by means of a set-screw, or otherwise. It is obvious that great variation may be made in the means for adjustably holding the totalizers upon their supporting bar, the specific form of means being immaterial. In the preferred construction, bar 34 is cylindrical, and located approximately midway between shafts 11 and 12, somewhat above them, so that the totalizers may be swung from side to side upon the bar as a pivot. The controlling-means here shown for causing the establishment or disestablishment of connection between the totalizers and the actuating means is a cam device, but is different from the one shown in my aforesaid application Serial Number 275,780, in that the cam track is stationary and the operating pin travels in unison with the traveling part of the machine.

Figure 1:
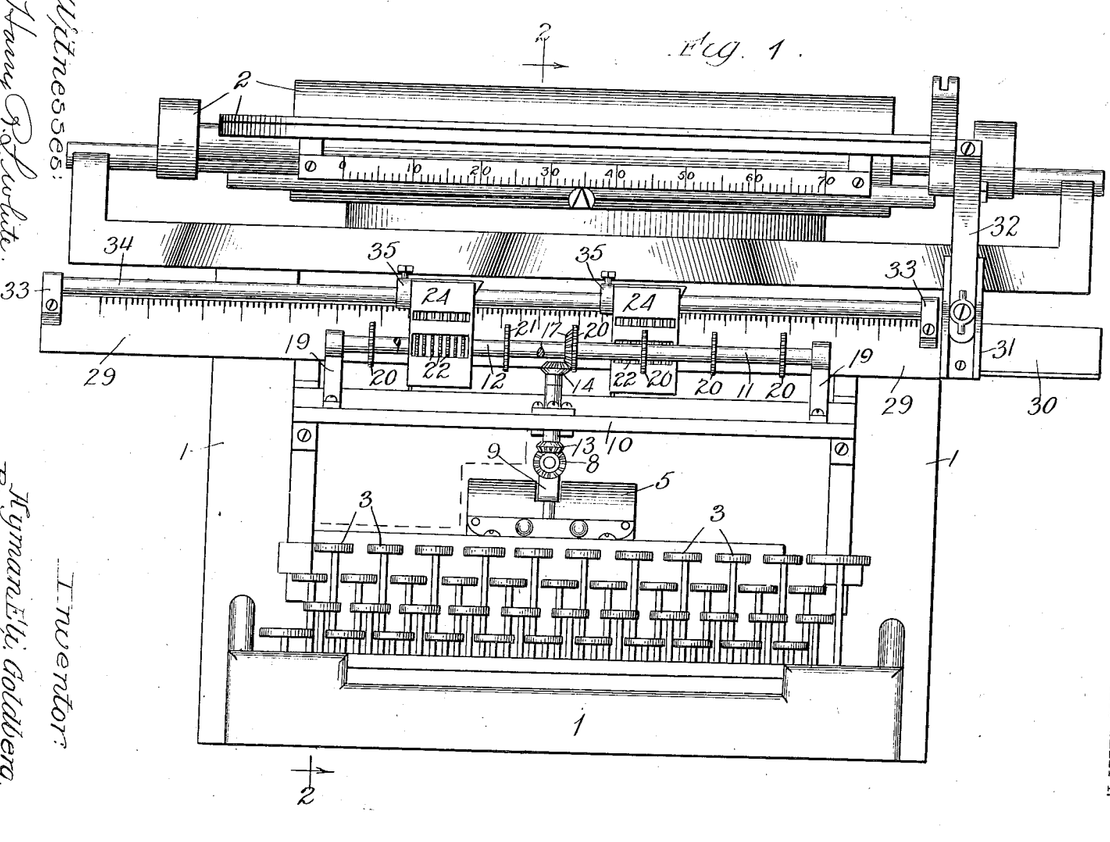
Figure 1 is a general front elevation of my invention in the form of a culculating attachment to a typewriter.
Figure 2:
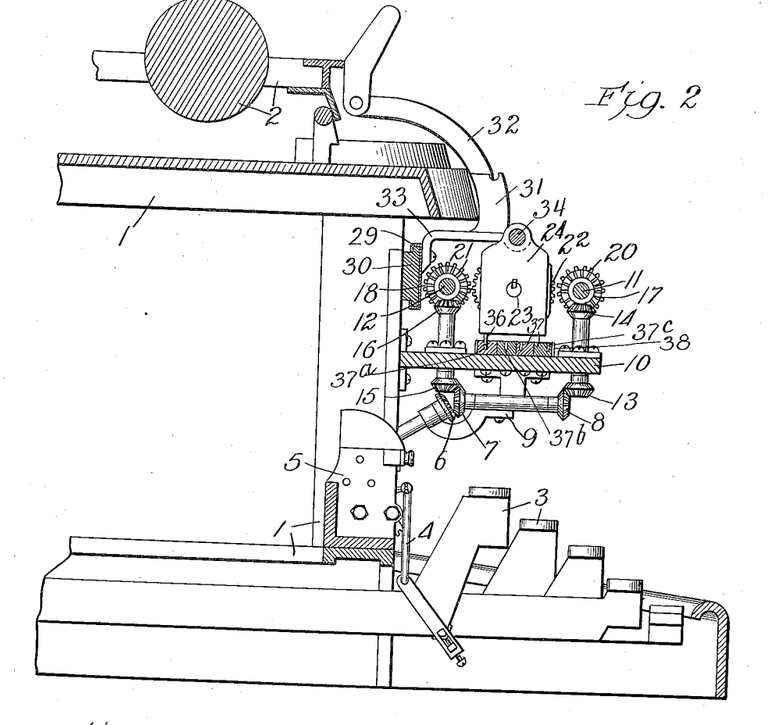
Fig. 2 is a front to rear sectional elevation taken on line 2—2, Fig. 1.
Figure 3:
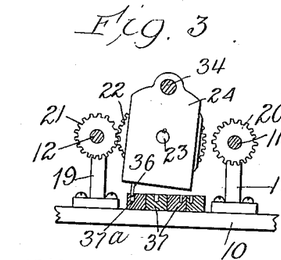
Figs. 3, 4 and 5 are views showing the totalizer respectively in positions to rotate one way, to remain idle and to rotate the opposite way.
Figure 4:
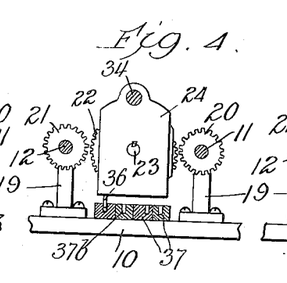
Figure 5:
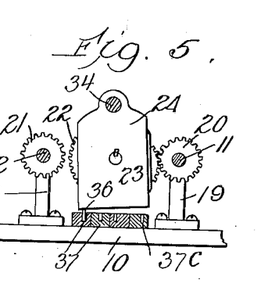
Figures 6, 7, 11, 12:
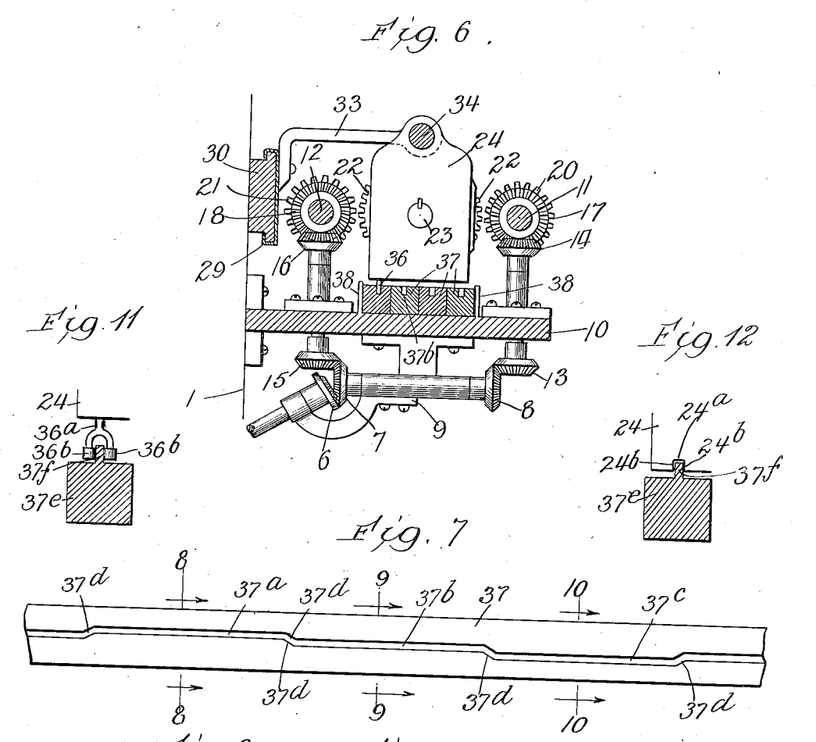
Fig. 6 is a view upon large scale showing the totalizer actuating means and controlling means, the view being taken in the same direction as Figs. 2 to 5, inclusive.
Fig. 7 is a plan view of one of the controlling cams.
Fig. 11 shows a modified form of cam and pin for controlling the connection between the totalizing mechanism and setting wheels.
Fig. 12 shows another modification of the cam and pin of the controlling mechanism. In this form the cam is elevated and enters between two acting surfaces on the wall of the totalizer.
Figure 8:
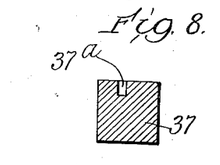
Figs. 8, 9 and 10 are sectional views taken respectively on lines 8—8, 9—9 and 10—10, Fig. 7.
Figure 9:
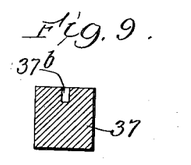
Figure 10:
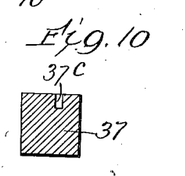
Figure 13:
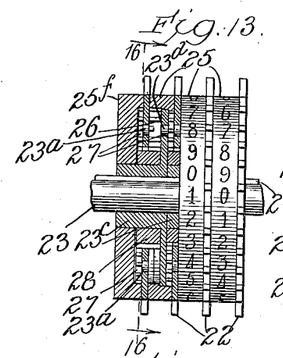
Fig. 13 is a front assembly view partly in section showing one form of totalizer suitable for use in the machine.

There are other features of novelty in connection with the present controlling means, which will now be described. In this device, (postponing for the present consideration of Figs. 11 and 12 the drawings which are hereafter referred to) each totalizer has a pin 36 which is adapted to be acted upon by the cam surfaces of the cam tracks 37. The cam surfaces 37ª, 37ᵇ and 37ᶜ (Fig. 7) are so related with reference to each other and to the other parts of the machine that when a pin 36 is in contact with surfaces 37ª the totalizer will mesh with the setting-wheel on one of the setting shafts, when said pin is in contact with the surfaces 37ᶜ, said totalizing wheels will mesh with the setting wheel upon the other of said shafts; and when said pin is in contact with the surfaces 37ᵇ, said totalizing wheels will remain out of mesh with said wheels; in other words, one of said cam surfaces will cause the totalizer to add, and another to subtract, and another to hold the totalizer in non-active position. The different cam surfaces 37ª, 37ᵇ and 37ᶜ are parallel with the line of travel of the totalizer, but the different surfaces connect one with the other by means of beveled or oblique surfaces 37ᵈ, so that the cam-pin 36 may be passed from one surface to another as the totalizer travels along the cam track. The actual construction of the cam and pin may be considerably varied without departing from the spirit of this invention, for example they may be formed in the manner shown in Figs. 11 or 12. In Fig. 11 the cam surfaces instead of being sunk below the upper surface of the cam or strip 37ᵉ are raised above it, forming the cam 37ᶠ. The cam pin 36ª is bifurcated and may with propriety be supplied with antifriction rollers 36ᵇ. The operation will be the same as in the previously described form of controlling device. The pin may also be double and integral with one of the walls 24 of the totalizer as shown in Fig. 12. In this case the wall has a notch 24ª with acting surfaces 24ᵇ, 24ᵇ on each side thereof which virtually constitute pins.

In the design of the machine here illustrated four separate cam-tracks are shown which renders it possible for four different totalizers each to have their own individual cam-tracks. It is obvious, however, that the number of cam tracks is immaterial, and it is also obvious that more than one totalizer might be operated from a single cam track. In order that the different totalizers may be controlled by their own cam tracks, the pins 36 occupy a different relative position upon each of the totalizers. For example, the totalizer adapted to be operated by the cam track nearest to the front has its pin nearest to the front of the totalizer, and the other totalizers have their cam-pins farther back, depending upon which one of the cam-tracks is intended to operate them.

The cam-tracks here shown are in the form of bars or strips having grooves or channels whose lateral surfaces constitute the cam-surfaces, and it is evident that a great number of different combinations of arrangement of cam-surfaces may be made. For instance, a strip or bar may be so constructed that it will cause its totalizer to add when opposite the first pair of setting wheels, subtract when opposite the second pair, and remain idle when opposite the third pair, or may cause the totalizer to subtract when opposite the first pair of setting wheels, add when opposite to the second pair, and remain idle when opposite to the third pair. In actual practice an operator will select a cam strip or bar, which has the desired combination of cam surfaces, and will continue to use this strip or bar as long as it serves his purpose by producing the successive actions desired for his bill or account. But the operator will change the strip or bar and substitute another, as soon as he wishes to produce a new kind of bill or account. As a matter of fact, in the ordinary commercial, banking, and brokerage houses, the same form of bill or account is repeated over and over, and therefore the substitution of new cam strips or bars will not be frequent, but in order that a cam strip or bar having the desired combination may be readily substituted when occasion demand, the strips are made removable by mounting them within the retaining walls or posts 38 mounted upon the bracket 10. The distance between the brackets depends upon the number of different strips which are to be in the machine at any one time, and new strips may be substituted by merely slipping the old strip out and the new one in. This form of controlling-cam has a certain advantage in that a whole new combination of results may be obtained by merely slipping in or adjusting to position a single strip or bar; and as the combination is permanent, or as it were, stereotyped, in any given cam strip or bar, the operator is relieved of the necessity of adjusting a number of separate pieces for each totalizer action and seeing that each one of these pieces is in its correct position before he operates the machine.

It will be noticed that there is no particular relation between the length of the cams and the width of the totalizers. It is possible to make the cams longer or shorter than the width of the corresponding totalizer. By making a cam shorter than the width of the corresponding totalizer, columns printed closely together may be summed and the amount registered on the totalizer, although the total of the items in each column may be considerably wider than the width allowed for the largest item on the paper. For example, let it be assumed that a machine is wanted for summing two columns of items which are always less than a dollar in amount. Let it be assumed that for some reason the two columns are to be located side by side on the paper without any space between them. It is obvious that ordinarily it will require three or four figures to represent the total of each of these columns, and such totals cannot of course be exhibited on a totalizer which has but two figure wheels, so for such a case, totalizers each having three or four or more figure wheels will be employed, and the cams will cause the first totalizer to be operated in its dimes and cents columns and immediately thereafter the second totalizer to be operated in its dimes and cents columns. The totalizers will then exhibit the proper sums even though three or four figure wheels be necessary in each totalizer to express them.

Attention is called to my copending application for patent for calculating machines, filed May 28, 1904, Serial No. 210,158.

What I claim as new and desire to secure by Letters Patent, is;

1. In combination, a totalizer and actuating means therefor, one being adapted to travel relatively to the other for coming into and moving out of coöperative relationship; and controlling means operative at a given point of travel of the traveling part for determining whether or not at said given point the connection between the totalizer and actuating means shall be established, said controlling means comprising a pin traveling in unison with the traveling part of the machine, and a non traveling cam adapted to operate said pin.

2. In combination, a totalizer and actuating means therefor, one being adapted to travel relatively to the other in order that they may come into connection with each other; and controlling means operative at a given point of travel of the traveling part for determining whether or not at said given point the connection between the totalizer and actuating means shall be established, said controlling means comprising a pin operating upon the traveling part and traveling in unison therewith and a non traveling cam adapted to operate said pin.

3. In combination, a totalizer and actuating means therefor, one being adapted to travel relatively to the other in order that they may come into connection with each other; and controlling means operative at a given point of travel of the traveling part for determining whether or not at said given point the connection between the totalizer and actuating means shall be established, said controlling means comprising a pin operating upon the traveling part and traveling in unison therewith and a stationary cam adapted to operate said pin, said cam having a plurality of acting surfaces which are parallel with the path of said pin and communicate one with another and yet are out of line with each other for producing a movement of the pin transverse to its line of travel.

4. In combination, a totalizer and actuating means therefor, one being adapted to travel relatively to the other in order that they may come into connection with each other; a stationary framework for supporting said totalizer and its actuating means; and controlling means operating at a given point of travel of the traveling part for determining whether or not at said given point the connection between the totalizer and actuating means shall be established, said controlling means comprising a pin traveling in unison with the traveling part of the machine and a stationary cam adapted to operate said pin, the resulting effect of the controlling means depending upon the position of said pin transversely to its line of travel and said cam being removably mounted upon the said stationary framework of the machine.

5. In combination, a totalizer and actuating means therefor, one being adapted to travel relatively to the other in order that they may come into connection with each other; and controlling means operative at a given point of travel of the traveling part for determining whether or not at said given point the connection between the totalizer and actuating means shall be established, said controlling means consisting of a cam and pin one of which travels relatively to the other and in unison with the traveling part of the machine, and the result of the action of the controlling means depending upon the position of the traveling part of the controlling means transversely to its line of travel, said cam having a plurality of connecting cam surfaces which are out of line with each other and parallel to the line of travel of the traveling part of the machine.

6. In combination, a totalizer and actuating means therefor, one being adapted to travel relatively to the other and said actuating means including a plurality of setting wheels arranged side by side whereby they and the totalizer come into juxtaposition seriatim, the distance between any two setting wheels being greater than the width of the totalizer whereby the totalizer is never in engagement with more than one setting wheel at a time; and controlling means for determining whether the connection between the totalizer and a setting wheel shall be established when the same are in juxtaposition, said controlling means including a cam and a pin one of which travels relatively to the other and in unison with the other traveling part of the machine, and one of said parts of the controlling means being shiftable transversely to the line of travel of the traveling part, and the action of the controlling means depending upon the transverse shifted position of the traveling one of its parts at the points where the totalizer and setting wheels are in juxtaposition, said cam having a plurality of acting surfaces, one for each setting wheel.

7. In combination, a totalizer and actuating means therefor, one being adapted to travel relatively to the other, and said actuating means including a plurality of pairs of setting wheels, the pairs being arranged side by side with axes parallel to the line of travel of the traveling part of the machine whereby the totalizer may be connected to the setting wheels of one pair after another, said pairs of wheels being located at a distance apart greater than the width of the totalizer whereby the totalizer is in connection with only one setting wheel at a time, the different wheels of a pair being adapted to produce opposite results in the totalizer; and controlling means for determining which setting wheel of any pair shall be in connection with the totalizer when the parts are otherwise in suitable relation for possible connection, said controlling means including a cam and a pin, one of which travels relatively to the other and in unison with the traveling part of the machine, one of said parts of the controlling means being shiftable transversely to its line of travel and the action of the controlling means depending upon the temporary position of the traveling part transversely to its line of travel, and said cam having a plurality of cam surfaces, one for each pair of setting wheels.

8. A totalizer and operating means therefor, adapted to operate the totalizer to add and to subtract, in combination with controlling means for positively determining whether the operating means shall operate the totalizer for addition or subtraction, said controlling means including a non traveling cam and a pin traveling relatively thereto for coming into contact therewith, one of said parts of the controlling mechanism being connected to said totalizer for controlling the operation thereof.

9. In a calculating machine the combination of a totalizer and operating mechanism therefor, said operating mechanism being adapted to operate said totalizer to add and to subtract; and controlling mechanism including a non traveling cam and a pin traveling along the same for being shifted transversely to its line of travel, the transverse position of said pin determining the relation between said totalizer and its operating mechanism whereby when the pin is in one transverse position the operating mechanism causes the totalizer to add and when said pin is in another transverse position the operating mechanism causes the totalizer to subtract.

10. In a calculating machine the combination of a totalizer; operating mechanism therefor and controlling means, said controlling means including two coöperating parts one of which consists of a non traveling cam and the other consists of a traveling member and adapted to coact with said cam, said traveling member being shiftable transversely to its line of travel, the first mentioned operating mechanism being adapted to operate said totalizer to add and likewise to subtract at a given point of travel of the traveling member of the controlling means, and said operating mechanism and totalizer being likewise adapted to be disconnected from each other at said given point, and the action of the controlling mechanism for addition or subtraction or non action at said given point depending upon the transverse position of said traveling member at said given point in its travel.

11. In a recording calculating machine having printing mechanism and a traveling paper carriage, the combination with said carriage and printing mechanism, of a totalizer and two separate members each adapted to actuate the totalizer and having opposite effects thereon, one addition and the other subtraction, said actuating members each being capable of being connected to the totalizer at the same printing point; and controlling mechanism including a non traveling cam and a pin adapted to establish the connection between the totalizer and a predetermined one of the actuating members, depending upon the position of the pin transversely to its line of travel, said pin traveling in unison with the paper carriage and said cam and pin coming into coöperative relation at the same aforesaid printing point, and the action of the cam upon the pin depending upon the location of the acting surface of the cam at the point thereof corresponding to the aforesaid printing point.

12. In a recording calculating machine having printing mechanism and a traveling paper carriage, the combination with said carriage and printing mechanism, of a totalizer and two separate setting wheels each adapted to actuate said totalizer and having opposite effects thereon, one addition and the other subtraction, said setting wheels having parallel axes and each being operative upon the totalizer at the same printing point; and controlling mechanism including a non traveling cam and a pin adapted to establish the connection between the totalizer and a predetermined one of said setting wheels, depending upon the position of the pin transversely to its line of travel, said pin traveling in unison with the paper carriage, and said cam and pin being in coöperative relation at the same aforesaid printing point, and the action of the cam upon the pin depending upon the location of the acting surface of the cam at the point thereof corresponding to the aforesaid printing point.

13. In a recording calculating machine having printing mechanism and a traveling paper carriage, the combination with said carriage and printing mechanism, of a totalizer and two separate setting wheels for separately operating said totalizer, said wheels being both located opposite to the same printing point and having parallel axes and adapted to have different effects upon said totalizer, one addition and the other subtraction; and controlling mechanism including a non traveling cam and a pin adapted to establish the connection between the totalizer and a predetermined one of the setting wheels, depending upon the position of said pin transversely to its line of travel, said pin traveling in unison with the paper carriage, and said cam and pin being coöperative at the aforesaid printing point substantially as described.

14. In a recording calculating machine having printing mechanism and a traveling paper carriage, the combination with said carriage and printing mechanism, of a totalizer and a plurality of pairs of setting wheels adapted to operate said totalizer, two different wheels of each pair having opposite effects upon the totalizer and both wheels of a pair being operative at the same printing point and the different pairs being operative at different printing points; and controlling mechanism including a pin traveling in unison with the paper carriage and adapted to establish the connection between the totalizer and the predetermined ones of the setting wheels depending upon the position of the pin transversely to its line of travel as the carriage reaches the respective printing points, and said controlling mechanism also including a stationary cam having a series of acting surfaces operative upon said pin at the aforesaid different printing points.

15. In a recording calculating machine having a stationary framework, a paper carriage traveling thereon and printing mechanism; the combination, with said framework, carriage, and printing mechanism, of a totalizer and a plurality of pairs of setting wheels adapted to operate said totalizer, the different wheels of each pair having opposite effects upon the totalizer and both wheels of a pair being operative at the same printing point and the different pairs being operative at different printing points; and controlling mechanism including a pin traveling in unison with the paper carriage and adapted to establish the connection between the totalizer and the predetermined ones of the setting wheels as the carriage reaches the respective printing points, the position of the pin transversely to its line of travel, at any printing point, determining with which of the pair of setting wheels at that point the totalizer shall be connected, and said controlling mechanism also including a stationary cam having a series of acting surfaces operative upon said pin at the aforesaid different printing points, said cam being removably mounted upon said framework whereby cams having different combinations of acting surfaces may be substituted.

16. In a recording calculating machine having printing mechanism and a traveling paper carriage, the combination with said carriage and printing mechanism, of a plurality of totalizers, two separate setting wheels for operating said totalizers one at a time, each of said wheels being adapted to operate a totalizer at the same printing point of the machine and said setting wheels having opposite effects upon a totalizer, one of said wheels being adapted to produce addition and the other subtraction; and controlling mechanism including a plurality of pins one for each totalizer, traveling in unison with the paper carriage and adapted to establish the connection between their respective totalizers, one at a time, and a predetermined one of said setting wheels as the carriage reaches the aforesaid printing point, said controlling mechanism also including a plurality of stationary cams one for each of said pins for operating the same, each of said cams being operable upon its respective pin independently of the others, whereby either different or similar effects may be produced upon the different totalizers when the latter reach their turn to be acted upon.

17. In a recording calculating machine having printing mechanism and a traveling paper carriage, the combination, with said carriage and printing mechanism of a plurality of totalizers and two separate setting wheels for operating the same one at a time, each of said wheels being adapted to operate a totalizer at the same printing point of the machine and said setting wheels having opposite effects upon a totalizer, one of said wheels being adapted to produce addition and the other subtraction; and controlling mechanism including a plurality of pins connected to said carriage so as to travel therewith, one pin for each totalizer and each pin having a different location relatively to the path of said carriage and each pin being adapted to establish the connection between its totalizer and one or the other of said setting wheels depending upon the position of said pin transversely to its line of travel and said controlling mechanism also including a plurality of stationary cams one for each pin and located out of line with each other relatively to the path of the carriage so that said cams may act upon their respective pins independently of each other, said cams being so located relatively to the printing mechanism and said pins being so located relatively to said carriage that a cam and pin are in cooperative relation during the printing of the number.

18. A typewriter having a framework, a carriage traveling thereon and a printing mechanism; in combination with a calculating attachment comprising a pair of setting wheels mounted in said framework, one opposite to the other, a totalizer mounted on said carriage and adapted to be operated by either one of said setting wheels at the same printing point, said setting wheels having opposite effects upon said totalizer, and controlling means for determining which of said setting wheels shall operate upon the totalizer when the latter is opposite to said wheels, said controlling mechanism including a pin traveling with and operative upon said totalizer and said controlling mechanism also including a stationary cam operative upon said pin when the latter is opposite to said setting wheels.

19. A typewriter having a framework, a carriage traveling thereon and a printing mechanism; in combination with a calculating attachment comprising a pair of setting wheels mounted upon said carriage and adapted to pass said setting wheels, said totalizer and setting wheels being relatively shiftable transversely to the path of the totalizer; and controlling mechanism for shifting the transversely shiftable part for bringing said totalizer and one or the other of said setting wheels into connection when the totalizer is opposite to said wheels, said controlling mechanism including a pin operative upon the transversely shiftable part and traveling in unison with the carriage, and said controlling mechanism also including a stationary cam operative upon said pin at that point in the travel of the carriage where the totalizer is opposite to said setting wheels.

20. A typewriter having a framework, a carriage traveling thereon and a printing mechanism; in combination with a calculating attachment comprising a pair of setting wheels mounted in said framework one opposite to the other; a reversible totalizer mounted upon said carriage and adapted to pass said setting wheels, said totalizer and setting wheels being relatively shiftable transversely to the path of the totalizer; and controlling mechanism for shifting the transversely shiftable part for bringing said totalizer and one or the other of said setting wheels into connection when the totalizer is opposite to said wheels, said controlling mechanism including a pin operative upon the transversely shiftable part and traveling in unison with the carriage, and said controlling mechanism also including a stationary cam operative upon said pin when the totalizer is opposite to said setting wheels.

21. A typewriter having a framework, a carriage traveling thereon, and a printing mechanism; in combination with a calculating attachment comprising a pair of setting wheels mounted in said framework one opposite to the other; a totalizer mounted upon said carriage and adapted to pass said setting wheels, said totalizer being shiftable transversely to the path of the carriage for coming into engagement with one or the other of said setting wheels when brought opposite to them by the travel of the carriage; and controlling mechanism for shifting said totalizer transversely to the path of the carriage, said controlling mechanism including a pin traveling with the totalizer and a stationary cam adapted to operate said pin when the totalizer is opposite to said setting wheels.

22. In combination, a totalizer operating means therefor including means operating it to add and means operating it to subtract and said operating means also including a set of figure keys; and means for positively controlling the connection between said totalizer and its different operating means, said controlling means being also adapted to disconnect said totalizer from its operating means, said controlling means including a stationary cam and a pin traveling relatively thereto for coming into coöperation therewith, the travel of the pin resulting from the action of the keys and the action of the controlling means depending upon the position of the pin transversely to its line of travel.

23. In combination, a totalizer, operating means therefor including means operating it to add and means operative at the same point of action operating it to subtract, and means for controlling the relation between the totalizer and its operating means to determine by which part thereof the totalizer shall be operated at the aforesaid point of action, said controlling means including two parts, to wit; a stationary cam and a pin traveling relatively thereto for coming into coöperation therewith, one of said parts of the controlling means being removable for substitution by other similar parts, whereby the operator may have a selection with regard to one of the two parts of the operating means, to thereby determine the kind of action upon the totalizer at the aforesaid point of action.

24. In a calculating machine the combination of a totalizer and operating means therefor said operating means including two setting wheels acting in opposite directions upon the totalizing mechanism, both of them being operative at the same point of action and bearing such relation to each other that only one is operative upon the totalizer at a time, said operating means also including a valuating shaft for operating said setting wheels and also a valuating mechanism for rotating said valuating shaft always in the same direction an amount depending upon the value of the digit to be set up and said operating means also including a set of figure keys; and controlling means for establishing the connection between said totalizer and one or the other of said setting wheels at the aforesaid point of action, said controlling mans including a stationary cam and a pin traveling relatively thereto, in consequence of the action of the keys.

25. In a calculating machine the combination of a pair of setting wheels on different parallel shafts, a plurality of totalizers adapted to pass between them in succession, and a stationary cam for each totalizer for determining which setting wheel the totalizer shall mesh with when between said wheels.

26. In combination with a calculating machine having a stationary framework, a carriage traveling thereon, keys, key action and differential mechanism, of a plurality of pairs of setting wheels located on different parallel shafts and operated by the differential mechanism, a plurality of totalizers adapted to pass between the setting wheels in succession and adapted to engage one or the other or neither of the wheels of a pair, to thereby produce addition, subtraction or non action, and a stationary cam for each totalizer for moving it to some one of its three possible positions when between any given pair of setting wheels.

27. In a calculating machine, the combination of a totalizer having a series of ordinal places, master means for operating the totalizer in its ordinal places *seriatim*, and connecting mechanism for predetermining at which of the ordinal places the master means shall commence to operate, said connecting mechanism being positive acting throughout all of the ordinal places of said totalizer.

28. In a calculating machine, the combination of a totalizer having a series of ordinal places, master means for operating the totalizer in its ordinal places *seriatim*, and connecting mechanism for establishing connection between the master means and totalizer at any predetermined one of its ordinal places, said connecting mechanism being positive acting throughout all of the places of said totalizer.

29. In a calculating machine, the combination of a totalizer having a series of ordinal places, master means for operating the totalizer in its ordinal places *seriatim*, and connecting mechanism for establishing the connection between the master means and totalizer, said connecting mechanism being adapted to positively control said connection throughout all of the ordinal places of the totalizer and to establish such connection commencing with any predetermined one of said ordinal places.

30. In a recording calculating machine the combination of a plurality of totalizers, a plurality of operating means therefor and cams for bringing said totalizers into and out of connection with their operating means, said cams being shorter than the width of the totalizers.

31. In a calculating machine, a totalizer, master means therefor, said totalizer having a series of operating points and said master means including means to operate the totalizer to add and means to operate it to subtract and controlling means including a removable, replaceable member whose contour determines for each operating point in the machine independently of the other operating points in the machine whether said master means shall operate said totalizer to add or subtract or not operate it.

32. In a calculating machine, a totalizer, master means therefor, one traveling relatively to the other, said totalizer having a series of ordinal places and the machine having a series of operating points in excess of the number of ordinal places in said totalizer, said master means including means to operate said totalizer to add and means to operate it to subtract, and controlling means including a removable, replaceable member whose contour determines for each operating point in the machine whether said master means shall operate said totalizer to add or to subtract or not operate it.

33. In a calculating machine, a totalizer, having a series of ordinal places, master means therefor, one traveling relatively to the other, said master means including members distributed at a plurality of points to thereby afford points of operation in the machine in excess of the number of ordinal places in the totalizer, said master means including means to operate said totalizer to add and means to operate it to subtract, and controlling means including a removable, replaceable member whose contour determines for each operating point in the machine whether said master means shall operate said totalizer to add or to subtract or not operate it.

34. In a calculating machine, a totalizer having a series of ordinal places, master means therefor, one traveling relatively to the other, said master means including members distributed at a plurality of points to thereby afford points of operation in the machine in excess of the number of ordinal places in the totalizer, said master means including means to operate said totalizer to add and means to operate it to subtract, and controlling means including a cam bar which is positive acting for all operative points in the machine and is removably mounted in order that it may be replaced when desired by other cam bars having different cam surfaces.

35. In a calculating machine, the combination of a plurality of totalizers, each having a series of ordinal places, a plurality of master means each adapted to operate all of said totalizers, the totalizer and master means having relative travel to cause the totalizer to be operated in different ordinal places *seriatim*, and controlling means operative at a given point of travel of the traveling part for determining whether or not at said given point the connection between the totalizers and master means shall be established, said controlling means including pins and a set of interchangeable bars one for each totalizer.

36. In a calculating machine, a totalizer having a series of ordinal places and actuating means therefor, one being adapted to travel relatively to the other, said actuating means including a plurality of members distributed at different points farther apart than the width of the totalizer whereby the machine has operating points exceeding in number the number of ordinal places in the totalizer, said actuating means including means to operate the totalizer to add and means to operate it to subtract and controlling means for determining at its operating point in the machine whether the totalizer shall add or subtract or not operate, said controlling means comprising a pin traveling in unison with the traveling part of the machine, non traveling cams adapted to operate said pin at all of the operating points in the machine, said cams being united in a single removable cam bar whereby the cams may all be removed from the machine as a unit.

In witness whereof, I have hereunto subscribed my name in the presence of two witnesses.

HYMAN ELI GOLDBERG.

Witnesses:
 DWIGHT B. CHEEVER,
 HOWARD M. COX.